(12) United States Patent
Nagaraj et al.

(10) Patent No.: US 7,291,403 B2
(45) Date of Patent: Nov. 6, 2007

(54) THERMAL BARRIER COATING SYSTEM

(75) Inventors: Bangalore A. Nagaraj, West Chester, OH (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 214 days.

(21) Appl. No.: 10/708,020

(22) Filed: Feb. 3, 2004

(65) Prior Publication Data

US 2005/0170200 A1   Aug. 4, 2005

(51) Int. Cl.
*B32B 15/04*    (2006.01)
(52) U.S. Cl. ............... 428/632; 428/701; 428/702; 416/241 B
(58) Field of Classification Search ........... 428/632, 428/701, 702; 416/241 B
See application file for complete search history.

(56) References Cited

U.S. PATENT DOCUMENTS 4,377,371 A * 3/1983 Wisander et al. ........ 415/173.4
5,073,433 A * 12/1991 Taylor ..................... 428/134
5,520,516 A * 5/1996 Taylor et al. ............ 416/241 B
5,981,088 A   11/1999 Bruce et al. .............. 428/633
6,102,656 A   8/2000 Nissley et al. ........... 415/174.4
6,716,539 B2 * 4/2004 Subramanian ............ 428/621
6,764,779 B1 * 7/2004 Liu et al. ................. 428/702
6,887,595 B1 * 5/2005 Darolia et al. ........... 428/701

* cited by examiner

*Primary Examiner*—John J. Zimmerman
*Assistant Examiner*—Aaron Austin
(74) *Attorney, Agent, or Firm*—David L. Narciso; Gary M. Hartman; Domenica N. S. Hartman

(57) ABSTRACT

A TBC system suitable for protecting the surface of a substrate subjected to a hostile thermal environment. The TBC system comprises a bond coat on the substrate surface, an alumina scale on the bond coat, and a multilayer TBC comprising a thermal-sprayed first ceramic layer on the alumina scale and a thermal-sprayed second ceramic layer overlying the first ceramic layer. The first ceramic layer consists essentially of partially stabilized zirconia so as to comprise the tetragonal and cubic phases of zirconia. The second ceramic layer consists essentially of fully stabilized zirconia so as to consist essentially of the cubic phase of zirconia. The second ceramic layer is also characterized by having vertical microcracks that extend through the thickness thereof. The second ceramic layer is thicker and more erosion resistant than the first ceramic layer.

19 Claims, 1 Drawing Sheet

THERMAL BARRIER COATING SYSTEM

BACKGROUND OF INVENTION

1. Field of the Invention

The present invention generally relates to thermal barrier coating systems for components exposed to high temperatures, such as gas turbine engine combustor liners and shrouds. More particularly, this invention is directed to a thermal barrier coating system having a multilayer thermal barrier coating comprising a spallation-resistant inner layer and a phase-stable outer layer.

2. Description of the Related Art

Components within the hot gas path of a gas turbine engine are often protected by a thermal barrier coating (TBC) system. TBC systems include a thermal-insulating topcoat, also referred to as the thermal barrier coating or TBC. Ceramic materials are used as TBC materials because of their high temperature capability and low thermal conductivity. The most common TBC material is zirconia ($ZrO_2$) partially or fully stabilized by yttria ($Y_2O_3$), magnesia (MgO) or another alkaline-earth metal oxide, ceria ($CeO_2$) or another rare-earth metal oxide, or mixtures of these oxides. Binary yttria-stabilized zirconia (YSZ) has particularly found wide use as the TBC material on gas turbine engine components because of its low thermal conductivity, high temperature capability including desirable thermal cycle fatigue properties, and relative ease of deposition by thermal spraying (e.g., air plasma spraying (APS) and high-velocity oxygen flame (HVOF) spraying) and physical vapor deposition (PVD) techniques such as electron beam physical vapor deposition (EBPVD).

To be effective, TBC's must remain adherent through many heating and cooling cycles. This requirement is particularly demanding due to the different coefficients of thermal expansion between ceramic materials and the superalloys typically used to form turbine engine components. As is known in the art, zirconia is stabilized with the above-noted oxides to inhibit a tetragonal to monoclinic phase transformation at about 1000° C., which results in a 3% to 4% volume change that can cause spallation. At room temperature, the more stable tetragonal phase is obtained and the monoclinic phase is minimized if zirconia is stabilized by at least about six weight percent yttria. A stabilizer (e.g., yttria) content of seventeen weight percent or more ensures a fully stable cubic phase. Though thermal conductivity of YSZ increases with decreasing yttria content, the conventional practice has been to partially stabilize zirconia with six to eight weight percent yttria (6-8% YSZ) with the understanding that 6-8% YSZ TBC is more adherent and spallation-resistant when subjected to high temperature thermal cycling than YSZ TBC containing greater amounts of yttria, particularly fully stabilized YSZ. Furthermore, partially stabilized YSZ (e.g., 6-8% YSZ) is known to be more erosion-resistant than fully stabilized YSZ (e.g., 20% YSZ).

The spallation resistance of TBC's is further improved with the use of an environmentally-protective metallic bond coat. Bond coat materials widely used in TBC systems include overlay coatings such as MCrAlX (where M is iron, cobalt and/or nickel, and X is yttrium or another rare earth or reactive element such as hafnium, zirconium, etc.), and diffusion coatings such as diffusion aluminides. When subjected to an oxidizing environment, these aluminum-rich bond coats develop an aluminum oxide (alumina) scale that is advantageously capable of chemically bonding a ceramic TBC to the bond coat and the underlying substrate.

Further improvements in TBC spallation resistance have been achieved through the development of TBC microstructures that exhibit enhanced strain tolerance as a result of the presence of porosity, vertical microcracks and/or segmentation. Segmentation indicates that the TBC has columnar grain boundaries oriented perpendicular to the surface of the component, such as that achieved with PVD processes, e.g., electron beam physical vapor deposition (EBPVD). The term "vertical microcracks" is used herein to denote fine cracks that are intentionally developed in thermal sprayed TBC's, whose microstructures generally consist of splats of irregular flat (noncolumnar) grains formed by solidification of molten particles of the TBC material. As is known in the art, ceramic TBC's having columnar grains and vertical microcracks are more readily able to expand with the underlying substrate without causing damaging stresses that lead to spallation. Plasma-sprayed TBC's with microcracks are discussed in U.S. Pat. Nos. 5,073,433, 5,520,516, 5,830, 586, 5,897,921, 5,989,343 and 6,047,539, and in Sumner et al., "Development of Improved-Durability Plasma Sprayed Ceramic Coatings for Gas Turbine Engines," AIAA/SAE/ASME 16th Joint Propulsion Conference, Jun. 30 through Jul. 2, 1980, Duvall et al., "Ceramic Thermal Barrier Coatings for Turbine Engine Components," ASME paper 82-GT-322.

The outer surface of a TBC sustains the highest temperatures, with higher TBC surface temperatures occurring with greater TBC thicknesses. As higher gas turbine operating temperatures are sought to increase engine efficiency, thicker TBC's (e.g., above 500 micrometers) are necessary to protect components from higher flow path gas temperatures. In applications such as the Joint Strategic Fighter (JSF), temperatures within the combustor and high pressure turbine (HPT) shroud may be as high as about 2800° F. (about 1540° C.), which is above the phase transformation temperature for 6-8% YSZ. As such, a 500+ micrometer-thick 6-8% YSZ TBC would be at a higher risk of spallation brought on by phase transformation.

In view of the above, it would be desirable if an improved TBC system were available that was suitable for use in applications where operating temperatures necessitate thick TBC's, resulting in TBC surface temperatures above the phase transformation temperature of partially stabilized YSZ.

SUMMARY OF INVENTION

The present invention provides a TBC system suitable for protecting the surface of a substrate subjected to a hostile thermal environment, notable examples of which are the combustor liners and HPT shrouds of gas turbine engines. The TBC system comprises a bond coat on the substrate surface, an alumina scale on the bond coat, and a multilayer TBC comprising a thermal-sprayed first ceramic layer on the alumina scale and a thermal-sprayed second ceramic layer overlying the first ceramic layer. The first ceramic layer consists essentially of partially stabilized zirconia so as to comprise the tetragonal and cubic phases of zirconia. Furthermore, the first ceramic layer is essentially free of vertical microcracks. In contrast, the second ceramic layer consists essentially of fully stabilized zirconia so as to predominantly comprise the cubic phase of zirconia. The second ceramic layer is also characterized by having dense vertical microcracks that extend through the thickness thereof. Finally, the second ceramic layer is thicker than the first ceramic layer and, as a result of its microstructure, is more erosion resistant than the first ceramic layer.

A significant advantage of this invention is that it provides a TBC system suitable for protecting the surfaces of gas turbine engine components when subjected to surface temperatures that exceed the phase transformation temperature of conventional 6-8% YSZ. More particularly, because the second ceramic layer of fully-stabilized zirconia does not undergo a phase transformation, the second ceramic layer can withstand the high surface temperatures that occur when thick TBC's (e.g., in excess of 500 micrometers) are subjected to the hot gas path of a gas turbine engine. Though fully-stabilized zirconia is known to have inferior erosion resistance as compared to partially-stabilized zirconia, the second ceramic layer exhibits suitable erosion resistance as a result of its dense, vertically-microcracked microstructure. The above benefits are achieved without degrading the spallation resistance of the TBC system by bonding the fully-stabilized second ceramic layer to the bond coat with the partially-stabilized first ceramic layer, whose spallation resistance is attributable in part to the phase compatibility of partially-stabilized YSZ and the underlying alumina scale.

Other objects and advantages of this invention will be better appreciated from the following detailed description.

DETAILED DESCRIPTION

Figure 1:
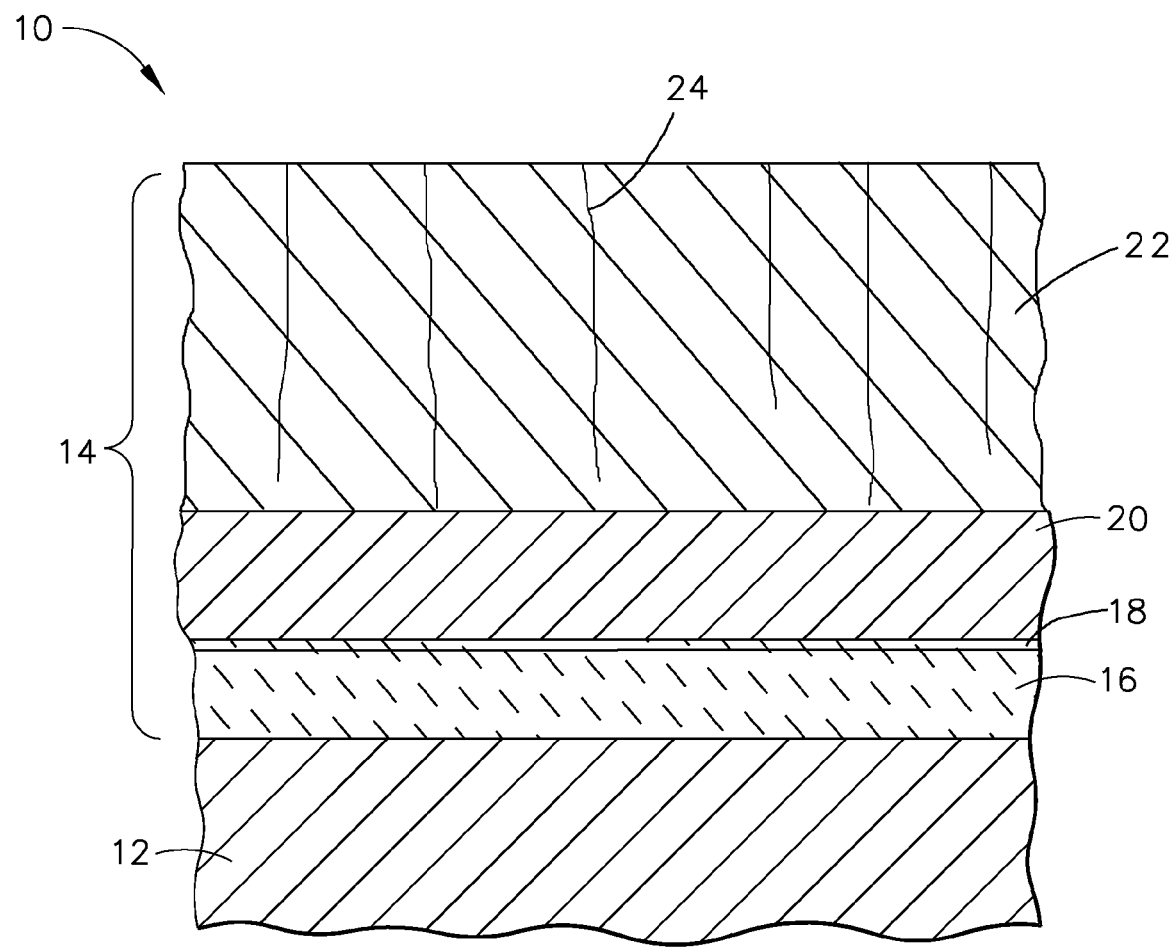
FIG. 1 represents a cross-sectional view of a surface region of a gas turbine engine component, on which a TBC system has been deposited in accordance with the present invention.

The present invention is generally applicable to components subjected to high temperatures, and particularly to components such as the combustor liners and the high pressure turbine (HPT) shrouds of gas turbine engines. While the advantages of this invention will be described with reference to gas turbine engine components, the teachings of the invention are generally applicable to any component on which a TBC may be used to protect the component from a high temperature environment.

FIG. 1 schematically represents a surface region of a component 10 protected by a TBC system 14 in accordance with a preferred embodiment of the invention. The TBC system 14 (not to scale) is shown as including a bond coat 16 overlying the surface of a substrate 12, the latter of which is preferably a superalloy or another high temperature material. The substrate 12 is typically the base material of the component 10 protected by the coating system 14, though the substrate 12 may instead be a coating on the component. The bond coat 16 is an aluminum-rich composition of a type typically used with TBC systems for gas turbine engine components, and preferably an overlay coating of an MCrAlX alloy known in the art. Aluminum-rich bond coats of this type develop an aluminum oxide (alumina) scale 18, which is thermally grown by oxidation of the bond coat 16.

Also shown in FIG. 1 is a multilayer TBC overlying the bond coat 16. The TBC comprises a ceramic inner layer 20 on and contacting the alumina scale 18, and a ceramic outer layer 22 on and contacting the inner layer 20. As will be discussed further below, the inner and outer layers 20 and 22 have noncolumnar microstructures as a result of being deposited by thermal spraying, a class of deposition processes that includes plasma spraying (air, vacuum, and low pressure) and high velocity oxy-fuel (HVOF) spraying. Thermal spraying involves propelling melted or at least heat-softened particles of a heat fusible material (e.g., metal, ceramic) against a surface, where the molten "splats" are quenched and bond to the surface to produce a coating whose microstructure is characterized by irregular flattened grains and a degree of inhomogeneity and porosity.

The inner and outer layers 20 and 22 are both zirconia-based materials containing at least one stabilizer. The inner and outer layers 20 and 22 differ in one respect by containing different levels of stabilizer, with the inner layer 20 containing only an amount sufficient to partially stabilize the zirconia, e.g., the inner layer 20 contains a mixture of tetragonal and cubic phases and will undergo a phase transformation if heated to a sufficient temperature for a sufficient length of time. In contrast, the outer layer 22 contains a sufficient amount of stabilizer to be fully stabilized, e.g., the outer layer 20 contains essentially only the cubic phase and will not undergo phase transformation, regardless of temperature. In the preferred embodiment in which the stabilizer is yttria, the inner layer 20 contains less than about 10 weight percent yttria, more preferably about 7% to about 8% yttria, while the outer layer 22 contains at least 15 weight percent yttria and up to about 22 weight percent yttria, more preferably about 18% to about 20% yttria. It is within the scope of this invention that additional or different stabilizers could be used if so desired, such as erbia, gadolinia, neodymia, ytterbia, lanthana, and/or dysprosia.

Though not shown, the embodiment of FIG. 1 may further include one or more intermediate layers between the inner and outer layers 20 and 22. Preferably, such an intermediate layer would be used to provide a compositional gradient between the layers 20 and 22. For example, a single intermediate layer containing a mixture of partially-stabilized and fully-stabilized zirconia could be used. Alternatively, multiple intermediate layers could be provided, with the relative concentrations of partially and fully-stabilized zirconia decreasing and increasing, respectively, in the direction toward the outer layer 22.

Fully-stabilized zirconia is known to exhibit poorer adhesion to aluminum-rich bond coats when thermal cycled as compared to partially-stabilized zirconia. The basis for this difference has been related to the phase compatibility of partially-stabilized YSZ (e.g., 6-8% YSZ) with the alumina scale 18 that thermally grows on aluminum-rich bond coats (such as the bond coat 16). Therefore, the inner layer 20 serves in the present invention to bond the outer layer 22 to the substrate 12. For this purpose, the inner layer 20 must be sufficiently thick, generally at least about 25 micrometers. In turn, the outer layer 22 serves to provide sufficient thermal protection for the inner layer 20 to avoid phase transformation of its partially-stabilized zirconia composition. The need to provide a sufficiently thick inner layer 20 to bond the outer layer 22 must be balanced with the need to minimize the thickness of the inner layer 20 so that its outer surface will not sustain temperatures that will cause its partially-stabilized zirconia composition to undergo phase transformation (about 1200° C. for 7-8% YSZ). For this purpose, the outer layer 22 preferably has a thickness greater than the inner layer 20, and the inner layer 20 is preferably limited to thicknesses of not more than about 250 micrometers. A suitable thickness for the inner layer 20 is believed to be about 50 to about 125 micrometers, while a suitable thickness for the outer layer 22 is believed to be about 125 to about 2000 micrometers, and more preferably about 125 to about 1500 micrometers.

In typical thermal environments within the turbine, combustor and augmentor sections of gas turbine engines, the combined thickness of the inner and outer layers 20 and 22 can generally by on the order of about 250 micrometers or more. In more demanding thermal environments where surface temperatures of 2800° F. (about 1540° C.) or more are expected, the combined thickness of the inner and outer layers 20 and 22 will generally be required to be at least 500 micrometers. For example, a suitable combined thickness for the layers 20 and 22 on a combustor liner is believed to be about 250 to about 750 micrometers, while a suitable combined thickness for the layers 20 and 22 on a HPT shroud is believed to be about 625 to about 1750 micrometers.

As fully-stabilized YSZ, the outer layer 22 (shown as the outermost layer of the TBC system 14) would be expected to be susceptible to damage from erosion, and therefore not a suitable material for defining the outer surface of the multilayer TBC. However, the erosion resistance of the outer layer 22 is improved to an acceptable level as a result of the manner in which the outer layer 22 is deposited, namely, thermal sprayed to have a microstructure referred to herein as dense vertical microcracks (DVM). Thermal-sprayed DVM TBC's are disclosed in U.S. Pat. Nos. 5,073,433, 5,520,516, 5,830,586, 5,897,921, 5,989,343 and 6,047,539. A preferred process for depositing the outer layer 22 is that taught in U.S. Pat. No. 5,073,433. As a result of this process, the outer layer 22 contains numerous vertical microcracks 24, preferably at least twenty-five cracks per linear inch of surface, with at least some of the microcracks 24 extending completely through the outer layer 22 to its interface with the inner layer 20. In contrast, the inner layer 20 is preferably deposited by conventional APS or another thermal spray process so as not to intentionally contain any vertical microcracks, as evident from FIG. 1. As a result of the different deposition techniques used, the inner layer 20 is characterized by a low thermal conductivity as a result of the APS deposition process, while the outer layer 22 is more erosion resistant than the inner layer 20, notwithstanding the fact that the fully-stabilized zirconia material of the outer layer 22 is known to be less erosion resistant than the partially-stabilized zirconia material of the inner layer 20.

In view of the above, it can be seen that the present invention provides a TBC system 14 in which the inner layer 20 has a partially-stabilized zirconia composition that is compatible with the thermally-grown alumina scale 18 that develops on the aluminum-rich bond coat 16, while the outer layer 22 has a fully-stabilized zirconia composition that does not undergo a phase transformation so as to be capable of withstanding temperatures above the phase transformation temperature of the inner layer 20. Though preferred thicknesses for these layers 20 and 22 will depend on the specific application and the resulting temperature gradient through the TBC, in each case the inner and outer layers 20 and 22 are present in relative thicknesses so that the inner layer 20 does not sustain temperatures that will cause phase transformation of its partially-stabilized zirconia composition, while the outer layer 22 can be permitted to sustain temperatures above the phase transformation of the inner layer 20 as a result of its fully-stabilized zirconia composition. As such, spallation that would be attributable to phase transformation of partially-stabilized zirconia is avoided by this invention, as is spallation attributable to phase incompatibility between fully-stabilized zirconia and the alumina scale 18. Another advantage of the present invention is the lower thermal conductivity of fully-stabilized zirconia as compared to partially-stabilized zirconia, which at least partially offsets the higher thermal conductivity of DVM TBC's as compared to TBC's conventionally deposited by APS.

While the invention has been described in terms of a preferred embodiment, it is apparent that other forms could be adopted by one skilled in the art. Therefore, the scope of the invention is to be limited only by the following claims.

The invention claimed is:

1. A thermal barrier coating system on a surface of a component, the thermal barrier coating system comprising:
 a bond coat on the surface of the component;
 an alumina scale on the bond coat; and
 a multilayer thermal barrier coating consisting of:
  a thermal-sprayed first ceramic layer on the alumina scale, the first ceramic layer consisting essentially of partially stabilized zirconia so as to comprise the tetragonal and cubic phases of zirconia, the first ceramic layer being essentially free of vertical microcracks;
  a thermal-sprayed noncolumnar second ceramic layer overlying the first ceramic layer and being the outermost layer of the thermal barrier coating system and defining the outermost surface of the component, the second ceramic layer having a thickness greater than the first ceramic layer, the second ceramic layer consisting essentially of fully stabilized zirconia so as to consist essentially of the cubic phase of zirconia, the fully stabilized zirconia of the second ceramic layer being less erosion resistant than the partially stabilized zirconia of the first ceramic layer, the second ceramic layer being in an as-thermal sprayed condition to have a microstructure characterized by irregular flattened grains and a degree of inhomogeneity and porosity, and to have vertical microcracks that extend through the thickness of the second ceramic layer in an amount of at least twenty-five cracks per linear inch of surface thereof to cause the second ceramic layer to be more erosion resistant than the first ceramic layer; and
  optionally one or more intermediate layers between the first and second ceramic layers, the one or more intermediate layers providing a compositional gradient between the first and second ceramic layers whereby concentrations of partially and fully-stabilized zirconia decrease and increase, respectively, in the direction toward the second ceramic layer, wherein in the absence of the one or more intermediate layers the second ceramic layer overlies and contacts the first ceramic layer.

2. The thermal barrier coating system according to claim 1, wherein the bond coat Is an overlay coating.

3. The thermal barrier coating system according to claim 2, wherein the bond coat is an MCrAlX overlay coating.

4. The thermal barrier coating system according to claim 1, wherein the first ceramic layer consists of zirconia, at least one stabilizer, and incidental impurities.

5. The thermal barrier coating system according to claim 4, wherein the stabilizer is yttria in an amount of about 7 to about 8 weight percent of the first coating layer.

6. The thermal barrier coating system according to claim 1, wherein the second ceramic layer consists of zirconia, about 18 to about 20 weight percent of yttria as a stabilizer, and incidental impurities.

7. The thermal barrier coating system according to claim 1, wherein the first ceramic layer is an air plasma sprayed layer.

8. The thermal barrier coating system according to claim 1, wherein the first and second ceramic layers are plasma sprayed layers.

9. The thermal barrier coating system according to claim 1, wherein the first and second ceramic layers have a combined thickness of at least 250 micrometers.

10. The thermal barrier coating system according to claim 9, wherein the first ceramic layer has a thickness of about 25 to about 250 micrometers.

11. The thermal barrier coating system according to claim 9, wherein the second ceramic layer has a thickness of about 125 to about 2000 micrometers.

12. The thermal barrier coating system according to claim 9, wherein the first and second ceramic layers have a combined thickness of at least 500 micrometers.

13. The thermal barrier coating system according to claim 1, wherein the component is a gas turbine engine component.

14. The thermal barrier coating system according to claim 13, wherein the gas turbine engine component is a combustor liner.

15. The thermal barrier coating system according to claim 13, wherein the gas turbine engine component is a turbine shroud.

16. A thermal barrier coating system on a surface of a gas turbine engine component, the thermal barrier coating system comprising:
   an overlay bond coat on the surface of the component;
   an alumina scale on the bond coat; and
   a multilayer thermal barrier coating consisting of:
      a plasma-sprayed first ceramic layer on the alumina scale, the first ceramic layer consisting essentially of zirconia partially stabilized by about 7 to about 8 weight percent yttria so as to comprise the tetragonal and cubic phases of zirconia and so as to have a phase transformation temperature, the first ceramic layer being essentially free of vertical microcracks; and
      a plasma-sprayed noncolumnar second ceramic layer on and contacting the first ceramic layer and being the outermost layer of the thermal barrier coating system and defining the outermost surface of the component, the second ceramic layer consisting essentially of zirconia fully stabilized by about 18 to about 20 weight percent yttria so as to consist essentially of the cubic phase of zirconia, the fully stabilized zirconia of the second ceramic layer being less erosion resistant than the partially stabilized zirconia of the first ceramic layer, the second ceramic layer being in an as-plasma sprayed condition to have a microstructure characterized by irregular flattened grains and a degree of inhomogeneity and porosity, and to have vertical microcracks that extend through the thickness of the second ceramic layer in an amount of at least twenty-five cracks per linear inch of surface thereof to cause the second ceramic layer to be more erosion resistant than the first ceramic layer;
   wherein the first and second ceramic layers have a combined thickness of about 500 to about 2000 micrometers, the first ceramic layer has a thickness of up to about 125 micrometers, and the second ceramic layer is thicker than the first ceramic layer.

17. The thermal barrier coating system according to claim 16, wherein the gas turbine engine component is subjected to an operating temperature at which the first ceramic layer sustains maximum temperatures below the phase transformation temperature thereof and the second ceramic layer sustains maximum temperatures above the phase transformation temperature of the first ceramic layer.

18. The thermal barrier coating system according to claim 16, wherein the gas turbine engine component is a combustor liner.

19. The thermal barrier coating system according to claim 16, wherein the gas turbine engine component is a turbine shroud.

* * * * *